3,297,522
METHOD OF USING N-CYCLOHEXYL DIHALO MALEIMIDE AND N-(4-METHYLPHENYL) DI-HALO MALEIMIDE FUNGICIDES
Denis Lee, Widnes, and John Norman Turner and John Angus William Turner, Bracknell, England, assignors to Imperial Chemical Industries Limited, London, England, a corporation of Great Britain
No Drawing. Filed May 31, 1963, Ser. No. 284,381
Claims priority, application Great Britain, Jan. 23, 1956, 2,146/56; Jan. 13, 1958, 1,139/58
10 Claims. (Cl. 167—33)

This application is a continuation-in-part of Serial No. 784,857, filed January 5, 1959, now abandoned, and Serial No. 186,834, filed April 12, 1962, now abandoned, the latter being in turn a continuation-in-part of Serial No. 635,101, filed January 22, 1957, now abandoned. The entire subject matter of each of these prior applications is incorporated herein by reference.

The invention herein is concerned with the use of N-(4-methylphenyl) dichloromaleimide or the dibromo counterpart thereof to destroy or otherwise control fungi. Thus, according to the invention, it has been found that N-(4-methylphenyl) dichloromaleimide, which may also be called N-para-tolyl dichloromaleimide, is unexpectedly effective as a foliage fungicide for application to plants, e.g. tomato plants. This compound may be illustrated by the formula:

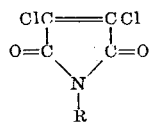

wherein R stands for the tolyl or 4-methylphenyl radical.

The above compound is conveniently used in the form of a composition comprising the active constituent and a diluent material, which may be either solid or liquid according to the way in which the composition is to be applied. Thus, the active component may be used as a foliage spray, dust or the like. If a dust is desired, the diluent may be talc, diatomaceous earth or other inert solid diluent. If however a liquid form is required, the composition may comprise a solution of the active material in an appropriate solvent, if desired in the presence of a dispersing agent, or it may be in the form of an emulsion, or dispersion in water of the active material or a solution thereof.

The success of the invention is due to the discovery that N-(4-methylphenyl) dichloromaleimide is unusually effective as a foliage fungicide in destroying or controlling a wide variety of plant fungi. The unique and unexpected nature of this discovery is shown by comparative data included herein.

Typical plants which may be treated according to the present invention are tomatoes, oats, wheat, potato and tobacco although it will be appreciated that the invention is also applicable to other plants. Examples of fungi destroyed or controlled in a highly effective manner by the fungicide of the invention include those identified as Alternaria solani, Erysiphe graminis, Puccinia triticina, Phytophthora infestans and Peronospora tabacina.

The active ingredient is used herein in amount which are non-phytoxic to the plants. Compositions containing 0.05% by weight of the active ingredient or even higher, e.g. 0.2% by weight, may be used. A highly desirable fungicidal effect is obtained well below the point where the compound may become phytoxic. For example, a fungicidally effective amount may be as low as 0.001% by weight of the active ingredient in water or even lower as will be apparent hereinafter. Stated another way, the dichloromaleimide of the invention may be used in amounts varying from about 0.1 to 1 pound per acre of plants to provide the desired fungicidal, non-phytoxic effect.

The invention is illustrated, but not limited, by the following examples:

Example I

Tests were carried out in glasshouse to compare the effectiveness of N-(4-methylphenyl) dichloromaleimide with other N-substituted dichloromaleimides and a standard composition as foliage fungicides.

Four diseases were used in foliage fungicide tests in the glasshouse. These were Alternaria solani on tomatoes, Erysiphe graminis on oats, Puccinia triticina on wheat and Phytophthora infestans on tomatoes. The method of testing compounds varied slightly for each disease but the sequence of operations was the same for all the diseases.

The plants were first sprayed with a dispersion of the compound being tested. Up to four different concentrations of each chemical were used and two or three replicates were used for each concentration. One set of control plants was sprayed with distilled water and another set with a standard reference fungicide. After spraying the plants were allowed to dry overnight. They were then inoculated with spores of the appropriate pathogen and placed in an environment conducive to spore germination and infection. The plants were then placed in a glasshouse for a period to allow development of symptoms. Assessment was then carried out and the amount of disease on the treated plants expressed as a percentage of that on the control plants. The ED95 value, i.e. the concentration required to obtain 95% control of the disease was obtained by plotting the percentage disease figures at the various spray concentrations on a logarithmic scale and reading off the value from the regression curve obtained.

Table I gives the slight variations in method which are necessary when using the different diseases.

The dispersions of the compound in water were obtained by grinding together in water in a ball mill an appropriate amount of the compound being tested with either (a) an equivalent amount of surface active agent known by the trade name "Dispersol T," or (b) 1 part of a surface active agent known by trade name "Wafex goulac" with twenty-five parts of the compound being tested. The second method, (b), of dispersion was only used with N-(4-methylphenyl) dichloromaleimide. In all the tests against Erysiphe graminis on oats a wetting agent was added to the water dispersion of the compound before applying it to the plants. Wetting agents, and their final concentrations in the water dispersion as applied to the plants, were "Lubrol E" at 0.015%, "Tween 20" at 0.1 and 1.0% and "Agral LN" at 0.1 and 1.0%.

TABLE I.—VARIATIONS IN METHOD FOR GLASSHOUSE TESTS OF COMPOUNDS AS FOLIAGE FUNGICIDES

| Disease | Plant | Inoculation | Incubation | Development period | Assessment |
|---|---|---|---|---|---|
| *Alternaria solani* | Tomato, 6–7″ tall. | Sprayed with an aqueous spore suspension. | 100% R.H. for 24 hours. | 3–4 days | Lesion counts. |
| *Erysiphe graminis* | Oat, 3–4″ tall | Spores shaken from infected plants on to test plants. | Glasshouse | 7–8 days | Grading by eye. |
| *Puccinia triticina* | Wheat, 3–4″ tall | Spores shaken from infected plants on to rewetted test plants or sprayed with an aqueous spore suspension. | 100% R.H. for 24 hours. | 7–12 days | Grading by use of scale described in the Canadian Journal of Research, Section C, 1948, vol. 25, page 496 for *P. graminis tritici*. |
| *Phytophthora infestans*. | Tomato, 6–7″ tall. | Sprayed with an aqueous spore suspension. | 100% R.H. for 24 hours. | 2–3 days | Lesion counts. |

TABLE II.—RESULTS OF GLASSHOUSE TESTS WITH VARIOUS DICHLOROMALEIMIDES AS FOLIAGE FUNGICIDES

| Active compound | ED 95 (from *Alternaria solani* tests) | Percentage Disease at 0.05% a.i. with— | | | |
|---|---|---|---|---|---|
| | | A | B | C | D |
| N-phenyl dichloromaleimide | 0.017 | 2 | 80 | 1(100) | |
| N-(4-methylpheny) dichloromaleimide | 0.0055 | 0.4 | 1 | 0(60) | 0 |
| N-(2-chlorophenyl) dichloromaleimide | 0.015 | 0.6 | 50 | 1(40) | |
| N-(4-nitrophenyl) dichloromaleimide | 0.14 | 15 | 100 | 10(40) | |
| N-(3-chlorophenyl) dichloromaleimide | 0.025 | 3 | 100 | 5(40) | |
| Tetramethyl thiuram disulphide* | 0.047 | 5 | | | 20 |

Standard reference fungicide ("Thiram") for *Alternaria solani* and *Phytophthora infestans*.
A stands for *Alternaria solani* on tomatoes.
B stands for *Erysiphe graminis* on oats.
C stands for *Puccinia triticina* on wheat.
D stands for *Phytophthora infestans* on tomatoes.

NOTE: The percentage disease on control plants can be taken as 100 with the exception of tests with *Puccinia triticina*. In these tests, the percentage disease on the control plants is given in brackets in the table.

*Example II*

A field test was carried out against *Phytophthora infestans* on potato plants. The trial was laid out in the form of randomized blocks. There were four replicate plots for each treatment and each plot was 3 drills wide by 5 yards long.

Four sprays of N-(4-methylphenyl) dichloromaleimide at 0.1%, dispersed in water with "Wafex goulac," and of "Perenox" (50% cuprous oxide) at 0.2% Cu were applied at approximately fortnightly intervals. Assessment was made using the disease asssessment key for potato blight described in Plant Pathology 1952, I, 109.

Table III shows the results obtained from the field trial with N-(4-methylphenyl) dichloromaleimide and the preparation containing cuprous oxide known by the registered trade name of "Perenox."

TABLE III.—RESULTS OF A FIELD TRIAL AGAINST *PHYTOPHTHORA INFESTANS* ON POTATO PLANTS

| Name | Percent active ingredient | Percentage disease on foliage |
|---|---|---|
| N-(4-methylphenyl) dichloromaleimide | 0.1 | 0.1 to 5. |
| "Perenox," 50% cuprous oxide dispersible powder. | 0.2 | 5 to 50. |
| Control | | 50 to 95. |

NOTE: The percentage disease figures are the upper and lower limits observed over the four replicate plots for each treatment. These figures were obtained 30 days after the last spray application. The disease did not appear until between 2 and 3 weeks after the last spray application.

*Example III*

The following foliage fungicide tests were carried out using the same compounds as in Example I.

The tests were carried out on tomato plants. The plants were first sprayed with a dispersion of the compound being tested. The material was allowed to dry and the plant then inoculated with *Alternaria solani*. This was done by spraying with an aqueous suspension of the fungal spores. The plants were then left for 24 hours in humidity cabinets as a period of incubation. They were then placed in a greenhouse till lesions appeared. Three plants were treated in each test, along with three control plants, whose treatment differed in one respect, in that instead of spraying with the compound being tested they were sprayed with distilled water. 72 hours after inoculation, the lesions on the five main leaflets of each of five leaves per plant were counted. The lesion counts on the treated plants are converted to a percentage of those of the control plants. The ED95 and ED50 values, i.e. the concentration of fungicide to obtain 95% and 50% control of disease respectively are obtained by plotting the percentage disease figures at the various spray concentrations on a logarithmic scale and reading off the values from the regression curves obtained.

The following table shows the results obtained at four different spray concentrations, namely, 0.05, 0.01, 0.002, and 0.0004%. The dispersions of the compounds in water were obtained by grinding together in water in a ball mill an appropriate amount of the compound being tested with an equivalent amount of surface active agent known by the trade name "Dispersol T."

Figures are given showing the percentage disease and the ED95 and ED50 values, i.e. the concentration of compound necessary in each case to give 95% and 50% control, respectively, of the disease. It will be noted that the N-(4-methylphenyl) dicholoromaleimide is significantly more effective at all concentrations than the other compounds tested therewith. Of particular significance is the indication that the N-(4-methylphenyl) dichloromaleimide is effective to give 95% control at a concentration which is about one-third (.0055) of that for the next most active compounds (the n-phenyl and N-chlorophenyl derivatives) and about one-tenth of that necessary for the standard reference fungicide for *Alternaria solani* (tetramethyl thiuram disulphide).

TABLE IV

| Percent Concentration | Percent Disease at— | | | | ED95 | ED50 |
|---|---|---|---|---|---|---|
| | 0.05 | 0.01 | 0.002 | 0.0004 | | |
| Compound: | | | | | | |
| N-phenyl dichloromaleimide | 2 | 6 | 26 | 68 | 0.017 | 0.00072 |
| N-(4-methylphenyl) dichloromaleimide | .4 | 2 | 12 | 43 | 0.0055 | 0.00025 |
| N-(2-chlorophenyl) dichloromaleimide | .6 | 4 | 82 | 96 | 0.015 | 0.0031 |
| N-(3-chlorophenyl) dichloromaleimide | 3 | 10 | 30 | 73 | 0.025 | 0.00092 |
| N-(4-nitrophenyl) dichloromaleimide | 15 | 30 | 63 | 88 | 0.14 | 0.0042 |
| Tetramethyl thiuram disulphide | 5 | 15 | 36 | 65 | 0.047 | 0.00096 |

Example IV

The unique effectiveness of the N-(4-methylphenyl) dichloromaleimide is also shown by comparing the same with N-(4-methylphenyl) dichlorosuccinimide as a foilage spray against *Peromospora tabacina* on tobacco plants. Some of the tobacco plants were damage when the succinimide was applied at 0.1% active ingredient and killed at 0.5% concentration while, at these concentrations, the dichloromaleimide did no harm to the tobacco. The effectiveness of the dichloromaleimide against the tobacco disease was also much greater than that of the succinimide.

Example V

A dispersible powder was prepared by mixing together 50 parts of N-(4-methylphenyl) dichloromaleimide, 44 parts of china clay, 5 parts "Wafex Goulac" (which is the calcium salt of lignin sulphonic acid) and 1 part "Perminal" BX (which is a sodium salt of an alkylated naphthalene sulphonic acid) and grinding the mixture in a swing hammer mill.

This dispersible powder was used to prepare aqueous dispersions containing different amounts of N-(4-methylphenyl) dichloromaleimide, and these dispersions were used in controlling the following foliage pathogens. The treatment of the plants was carried out in the same manner as the glasshouse tests in Example I.

TABLE VI

Treatment: Percent fallen leaves
N-(4-methylphenyl) dichloromaleimide 0.2%
  a.i. _____ 23
Bordeaux mixture 0.5% _____ 26.7
Unsprayed _____ 58.2

TABLE VII

Yield assessment: Average yield in gms. per plant
N-(4-methylphenyl) dichloromaleimide _____ 1757
Bordeaux mixture _____ 659
Unsprayed _____ 4.5

It will be appreciated that corresponding dibromo derivative, i.e. N-(4-methylphenyl) dibromomaleimide, may be used in lieu of the abovementioned N-(4-methylphenyl) dichloromaleimide or in addition thereto. Thus, one or both of these fungicidally active components may be used for protecting foliage from fungal attack as aforesaid.

Another feature of the invention is the possibility of using N-cyclohexyl dibromomaleimide and/or N-cyclohexyl dichloromaleimide for industrial fungicidal uses such as protecting textiles from fungal attack, controlling slime in wood pulp mills and preserving the wood pulp from fungal attack, and treating and preserving timber or reconstituted timber products (such as hardboard),

TABLE V

| Organism | Test | Percent Disease at percent active ingredient in dispersion | | | | |
|---|---|---|---|---|---|---|
| | | 0.1 | 0.0316 | 0.01 | 0.0032 | 0.001 |
| *Alternaria solani* on tomato | 1 | 0 | 0.7 | 7 | 17 | 34 |
| | 2 | 0.5 | 1 | 4 | 17 | 44 |
| | 3 | 0.2 | 1 | 5 | 30 | 54 |
| *Erysiphe graminia* on oats | 1 | 5 | 1 | 10 | 100 | 100 |
| | 2 | 0 | 1 | 20 | 80 | 100 |
| | 3 | 0 | 1 | 20 | 40 | 80 |
| *Puccinia triticina* on wheat | 1 | 0 | 0 | 2 | 20 | 40 |
| | 2 | 0 | 0 | 2 | 40 | 80 |
| | 3 | 0 | 2 | 10 | 10 | 80 |

These results show that effective control of the above foliage pathogens could be obtained using dispersions of N-(4-methylphenyl) dichloromaleimide.

Example VI

The dispersible powder as prepared in Example V was compared with Bordeaux mixture in the control of fungal attack on grape vines. It was found that under conditions of very severe downy mildew attack aqueous dispersions containing 0.2% of N-(4-methylphenyl dichloromaleimide are equivalent to 0.5% Bordeaux mixture in controlling foliage infection and gave better control of disease on the grapes and the furthermore a better yield of fruit was obtained from those vines treated with N-(4-methylphenyl) dichloromaleimide. The results obtained are shown in Tables VI and VII.

by applying the active component thereto. The manner of using one or both of these N-cyclohexyl derivatives as industrial fungicides is the same as when using the N-(4-methylphenyl)-derivatives as foliage fungicides.

The following additional examples serve to further illustrate the invention:

Example VII

Glasshouse tomato plants were sprayed with a dispersion of the compound being tested. Three concentrations of each chemical were used. One set of control plants was sprayed with distilled water and another set with a fungicide of known activity. After spraying the plants were allowed to dry overnight. They were then inoculated with spores of *Alternaria solani* and placed in an environment conductive to spore germination and infection. The plants were then placed in a glasshouse for a period to allow development of symptoms. Assessment was carried out and the amount of disease on the treated plants expressed as a percentage of that on the control plants. The ED95 value, that is, the concentration required to obtain 95% control of the disease was obtained by plotting the percentage disease figures at the various spray concentrations on a logarithmic scale and reading off the value from the regression curve.

The results obtained with three dibromomaleimides are tabulated below:

TABLE VIII

| | Percent Disease at— | | | | |
|---|---|---|---|---|---|
| | 0.05% a.i. | 0.01% a.i. | 0.002% a.i. | ED95 | ED50 |
| Thiram | 23 | 69 | 98 | 0.13 | 0.019 |
| N-phenyl-dibromomaleimide | 3 | 23 | 69 | 0.035 | 0.0038 |
| N-(p-tolyl)-dibromomaleimide | 1 | 7 | 73 | 0.019 | 0.003 |
| N-cyclohexyl dibromomaleimide | 4 | 60 | 83 | 0.052 | 0.0074 |

The superiority of the N-(p-tolyl)-dibromomaleimide over the other three compounds as a foliage fungicide is apparent from the data set forth in Table VIII. On the other hand, the N-cyclohexyl dibromomaleimide and the corresponding N-cyclohexyl dichloromaleimide demonstrate better fungicidal activity when used as industrial funcicides, e.g. upon application to textiles or wood pulp, for controlling slime in wood pulp mills and for preserving timber or reconstituted timber.

*Example VIII*

The fungicidal activities obtained with the N-(4-methylphenyl) dibromo- and dichloro-maleimides of the invention when these compounds are tested "in vitro" against the fungi *Phoma pigmentivora, Memnoniella echinata, Ceratocystis pilifera, Polystictus versicolor, Oospora lactis, Penicillium notatum* (identified as Fungi 1–6, respectively) are recorded in the following table. The figures are p.p.m. of chemical required to inhibit growth of fungus. The last column (7) shows p.p.m. required to prevent spore germination.

TABLE IX

| Chemical Compound | Fungi | | | | | | |
|---|---|---|---|---|---|---|---|
| | 1 | 2 | 3 | 4 | 5 | 6 | 7 |
| N-p-tolyl dichloromaleimide | 16 | 400 | 16 | 400 | 400 | 400 | 8 |
| N-p-tolyl dibromomaleimide | 32 | 80 | 400 | 400 | 400 | | 40 |

In addition to the above fungi, the active components of the invention may be effectively used against *Fusarium graminearum, Pythium ultimum, Botrytis allii, Saccharomyces cerevisiae, Aspergillus niger* and *Venturia inaequalis.*

It will be appreciated that various modifications may be made in the invention described herein without in any way deviating from the scope thereof as defined in the following claims wherein:

We claim:

1. The method of controlling fungi in living plants which comprises treating said plants with a fungicidally effective but non-phytotoxic amount of N-(4-methylphenyl) dichloromaleimide.

2. The method of claim 1 wherein said fungi are selected from the group consisting of *Alternaria solani, Erysiphe graminis, Puccinia triticina, Phytophthora infestans* and *Peronospora tabacina.*

3. A method of protecting textiles against fungal attack which comprises applying to said textiles a fungicidal composition comprising N-cyclohexyl dibromomaleimide as the active fungicidal ingredient, and an inert fungicidal carrier therefor.

4. A method of controlling slime in wood pulp mills and preserving the wood pulp from fungal attack which comprises applying to said wood pulp a fungicidal composition comprising N-cyclohexyl dibromomaleimide as the active fungicidal ingredient and an inert fungicidal carrier therefor.

5. A method of treating and preserving timber which comprises applying to said timber a fungicidal composition comprising N-cyclohexyl dibromomaleimide as the active ingredient and an inert fungicidal carrier therefor.

6. A method of protecting foliage from fungal attack which comprises applying to said foliage a fungicidal composition comprising N-p-tolyl dibromomaleimide as the active fungicidal ingredient and an inert fungicidal carrier therefor, said active ingredient being applied in a fungicidally effective but essentially non-phytotoxic amount.

7. The method of claim 6 wherein said fungus is selected from the group consisting of *Phoma pigmentivora, Memnoniella echinata, Ceratocystis pilfera, Polystictus versicolor, Oospora lactis, Penicillium notatum, Aspergillus niger, Fusarium graminearum, Pythium ultimum, Botrytis allii, Saccharomyces cerevisiae, Venturia inaequalis* and *Alternaria solani.*

8. A method of protecting textiles against fungal attack which comprises applying to said textiles a fungicide selected from the group consisting of N-cyclohexyl dibromomaleimide and N-cyclohexyl dichloromaleimide.

9. A method of controlling slime in wood pulp mills and preserving the wood pulp from fungal attack which comprises applying to said wood pulp a fungicide selected from the group consisting of N-cyclohexyl dibromomaleimide and N-cyclohexyl dichloromaleimide.

10. A method of treating and preserving timber which comprises applying to said timber a fungicide selected from the group consisting of N-cyclohexyl dibromomaleimide and N-cyclohexyl dichloromaleimide.

References Cited by the Examiner

UNITED STATES PATENTS 2,205,558    6/1940    Flett _____ 167—33

SAM ROSEN, *Primary Examiner.*

JEROME D. GOLDBERG, *Assistant Examiner.*